(12) United States Patent
Kappich et al.

(10) Patent No.: US 9,383,059 B2
(45) Date of Patent: Jul. 5, 2016

(54) ASSEMBLY SECURING ARRANGEMENT

(71) Applicant: Dr. Ing. h.c. F. Porsche Aktiengesellschaft, Stuttgart (DE)

(72) Inventors: Joachim Kappich, Weil der Stadt (DE); Juergen Goeltenboth, Oehringen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 27 days.

(21) Appl. No.: 14/041,516

(22) Filed: Sep. 30, 2013

(65) Prior Publication Data

US 2014/0097322 A1   Apr. 10, 2014

(30) Foreign Application Priority Data

Oct. 4, 2012   (DE) .......................... 10 2012 109 448

(51) Int. Cl.
| | |
|---|---|
| *F16M 13/00* | (2006.01) |
| *F16M 13/02* | (2006.01) |
| *B60K 5/12* | (2006.01) |
| *B62D 21/00* | (2006.01) |

(52) U.S. Cl.
CPC .............. *F16M 13/02* (2013.01); *B60K 5/1208* (2013.01); *B60K 5/1216* (2013.01)

(58) Field of Classification Search
CPC .. B60K 5/1208; B60K 5/1216; B60K 5/1241; B60K 5/1291; B60K 5/125; B62D 21/11; F16H 57/025; F16H 57/028; F16H 57/032
USPC ......... 248/659, 559, 635, 562, 603, 629, 632; 248/638; 180/377, 378, 381, 382, 383, 384, 180/385; 74/606 R
See application file for complete search history.

(56) References Cited

U.S. PATENT DOCUMENTS

| | | | | |
|---|---|---|---|---|
| 1,698,006 A | * | 1/1929 | Steele .................... | B60G 11/38 267/30 |
| 1,867,070 A | * | 7/1932 | Glascock ............. | B60K 5/1216 248/582 |
| 2,636,749 A | * | 4/1953 | Kain ...................... | B62D 21/11 280/797 |
| 4,456,213 A | * | 6/1984 | Fukushima ............. | F16F 7/108 248/559 |
| 4,899,843 A | * | 2/1990 | Takano ................... | B62D 21/11 180/312 |
| 5,031,873 A | * | 7/1991 | Rau ........................... | F16F 1/52 248/632 |
| 5,460,238 A | * | 10/1995 | Burke ................... | B60K 5/1216 180/299 |
| 5,593,001 A | * | 1/1997 | Takano ................... | F16F 1/44 180/312 |
| 5,788,206 A | * | 8/1998 | Bunker .................. | B60K 17/00 248/634 |

(Continued)

FOREIGN PATENT DOCUMENTS

| | | |
|---|---|---|
| DE | 40 29 228 A1 | 4/1991 |
| DE | 102 02 956 A1 | 8/2003 |

(Continued)

OTHER PUBLICATIONS

Translation of WO 2005039959 A1, Buerger.*

(Continued)

*Primary Examiner* — Jonathan Liu
*Assistant Examiner* — Muhammad Ijaz
(74) *Attorney, Agent, or Firm* — RatnerPrestia

(57) ABSTRACT

An assembly securing arrangement, in particular for securing a transmission in a motor vehicle body, includes an assembly support and at least one assembly bearing for the vibration-damped mounting of an assembly, wherein the at least one assembly bearing is a load-bearing component of the assembly support.

11 Claims, 1 Drawing Sheet

(56) References Cited

U.S. PATENT DOCUMENTS

| | | | | |
|---|---|---|---|---|
| 6,408,974 B1* | 6/2002 | Viduya | ............. | B62D 21/00 180/312 |
| 6,564,892 B2* | 5/2003 | Wooldridge | ............. | B60K 5/12 180/300 |
| 7,789,189 B2* | 9/2010 | Bigg | ............. | B60K 17/00 180/312 |
| 7,900,741 B2* | 3/2011 | Nakazato | ............. | B60K 17/24 180/380 |
| 2002/0163113 A1* | 11/2002 | Seynaeve | ............. | B60K 5/1208 267/140.13 |
| 2003/0173134 A1 | 9/2003 | Unfried et al. | | |
| 2006/0169518 A1 | 8/2006 | Thomas et al. | | |
| 2009/0283352 A1* | 11/2009 | Hornisch | ............. | B62D 21/11 180/312 |
| 2010/0237220 A1* | 9/2010 | Grun | ............. | B60K 5/1208 248/573 |
| 2012/0091639 A1* | 4/2012 | Lee | ............. | F16F 13/10 267/140.11 |
| 2012/0285764 A1* | 11/2012 | Compton | ............. | B62D 21/02 180/312 |
| 2015/0352939 A1* | 12/2015 | Hatanaka | ............. | F16F 1/36 267/141 |
| 2016/0091079 A1* | 3/2016 | Compton | ............. | B60K 17/00 248/674 |

FOREIGN PATENT DOCUMENTS

| | | | | |
|---|---|---|---|---|
| DE | 103 47 096 A1 | 5/2005 | | |
| DE | WO 2005039959 A1 * | 5/2005 | ............. | B60K 5/1208 |
| DE | 10 2004 034 074 A1 | 2/2006 | | |
| DE | 10 2004 062 083 A1 | 7/2006 | | |
| DE | 10 2006 014 975 A1 | 10/2007 | | |
| DE | 10 2007 007 942 A1 | 8/2008 | | |
| DE | 10 2009 020 107 A1 | 11/2010 | | |
| WO | WO 2005/ 001 308 A1 | 1/2005 | | |
| WO | WO 2005039959 A1 * | 5/2005 | ............. | B62D 21/11 |

OTHER PUBLICATIONS

Search Report from German priority application DE 10 2012 109 448.9, dated Apr. 9, 2013, with partial English translation.

* cited by examiner

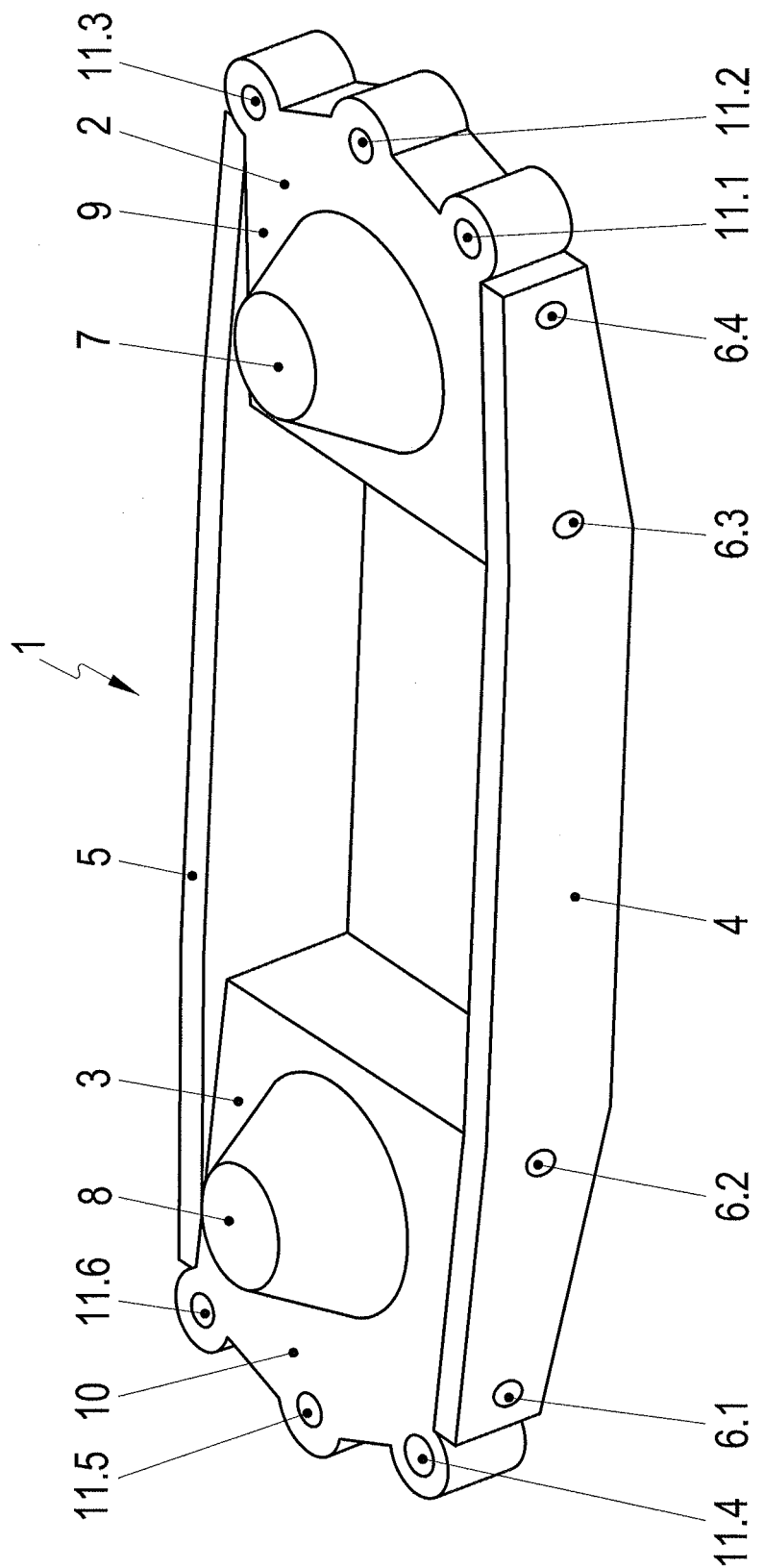

ASSEMBLY SECURING ARRANGEMENT

CROSS-REFERENCE TO RELATED APPLICATIONS

This application claims priority to German Patent Application No. 10 2012 109 448.9, filed Oct. 4, 2012, which is incorporated by reference herein in its entirety.

FIELD OF THE INVENTION

The invention relates to an assembly securing arrangement, in particular for securing a transmission in a motor vehicle body, comprising an assembly support and at least one assembly bearing for the vibration-damped mounting of an assembly.

BACKGROUND OF THE INVENTION

The vibration-damping or vibration-mitigating securing of assemblies in motor vehicles is well-known from the prior art. The fundamental problem is, firstly, that of achieving an arrangement which is highly stable in terms of positioning and securing reliability and, secondly, of, as far as possible, avoiding substantial freedom of transmission of vibration and force to other vehicle components. At the same time, issues arise regarding construction space and weight.

For example DE 40 29 228 A1, which is incorporated by reference herein, discloses an assembly mounting, in which a flexurally rigid crossmember is mounted on longitudinal members of the vehicle via rubber elements, wherein the assembly is secured via a centrally arranged, elastic assembly bearing.

DE 103 47 096 A1, which is incorporated by reference herein, discloses an assembly mounting, in which the actual assembly support (transmission mount) in a frame-like structure consists of a two-part crossmember and of separate mountings which are connected to the crossmember parts and are provided with elastic materials, for the securing to a vehicle frame or to the body.

Both structures mentioned above are relatively complicated.

SUMMARY OF THE INVENTION

The present invention provides a securing arrangement for an assembly, in particular for a transmission in a motor vehicle, which, with a space- and weight-saving construction, is intended to be able effectively to compensate for the forces and vibrations which occur.

An assembly bearing and assembly support form a unit, in which the assembly bearing is a load-bearing component of the assembly support. The assembly support here can consist of at least one torsionally rigid carrying profile on which the assembly bearing is directly securable. A particularly expedient development of the subject matter of the invention is produced in that the assembly support has one assembly bearing arranged in each case on the end sides of at least one carrying profile. The assembly support can be constructed from two carrying profiles, between which one assembly bearing is securable in each case on the end sides. The assembly support can be directly secured to the body of the vehicle in an expedient manner via securing points on the assembly bearings. It is advantageous in this case if the assembly bearing consists of a rubber-elastic bearing block for the mounting of an assembly and of a bearing support surrounding the bearing block in a load-bearing manner. The material-rigid bearing support can be screwed, riveted, welded or adhesively bonded to the carrying profile(s) and can have securing openings via which the assembly support can be directly secured on body parts.

In a particularly advantageous manner, the assembly support is designed substantially in a rectangular basic shape, wherein the narrow side of the rectangle is formed by two assembly bearings which are securable to body parts in the vehicle to the sides of the longitudinal axis of the vehicle and the longitudinal sides are formed by two carrying profiles connected to the assembly bearings.

BRIEF DESCRIPTION OF THE DRAWING

FIG. 1 shows a schematic illustration of an assembly securing arrangement according to aspects of the invention.

DETAILED DESCRIPTION OF THE INVENTION

Advantages and features of the invention can be gathered from the description below of an exemplary embodiment.

An assembly securing arrangement according to aspects of the invention, preferably for securing a transmission in a motor vehicle, is constructed from an assembly support 1. In the exemplary embodiment, said assembly support consists of assembly bearings 2, 3 which are connected via carrying profiles 4 and 5 to form a frame-like, torsionally and flexurally rigid unit in a substantially rectangular basic shape. Carrying profiles 4, 5 and assembly bearings are connected to one another in a stable manner by screwing, riveting (6.1, 6.2, 6.3 and 6.4) or else by welding or adhesive bonding.

The assembly bearing 2 or 3 is constructed from a rubber-elastic bearing block 7 or 8 and a bearing support 9 or 10 which surrounds said bearing block 7, 8 in a load-bearing manner and can be composed of relatively stiff materials, for example steel, aluminum or the like, or else of a material composite construction. Said bearing support, through the properties thereof and together with the carrying profiles 4, 5, has to be capable of compensating for vibrations or forces transmitted by the assembly as far as possible fully, but at least substantially, via the rubber-elastic bearing block 7 or 8.

The assembly bearing 2, 3 or the bearing support 9 or 10 thereof is provided with openings 11.1 to 11.6 via which the assembly support 1 can be screwed directly to parts of the body (not illustrated) of the motor vehicle. Said screwing openings 11.1 to 11.6 and/or the screws used for securing purposes may optionally additionally be provided with vibration-damping material or be connected.

The assembly to be secured via the assembly securing arrangement is placed—in a manner known per se—onto the rubber-elastic bearing blocks 7 and 8 and secured in a known manner so as to be appropriately fixed.

It is clearly apparent to a person skilled in the art that the invention is not restricted to this one exemplary embodiment described. Other constructions of the assembly bearing are conceivable; another arrangement of the carrying profiles or else the use of only one carrying profile connecting the assembly bearings is also conceivable.

What is claimed:

1. An assembly securing arrangement for securing a transmission in a motor vehicle body, comprising:
    two opposing frame members that are spaced apart,
    two assembly bearings each including (i) a stiff bearing support formed of a stiff material having side surfaces that are fixedly mounted between the opposing frame members by one or more fasteners, a topmost surface that is positioned to face the transmission, and openings formed on the topmost surface for securing the assembly bearing to the motor vehicle, the topmost surface being slanted with respect to a planar topmost surface of the frame members, and (ii) an elastic bearing block fixedly mounted to the topmost surface of the bearing support and extending to an elevation above the frame members and the topmost surface of the bearing support, the stiff bearing support being configured to be mounted to the transmission, and the elastic bearing block configured to be positioned against the transmission for a vibration-damped mounting of the transmission, wherein each assembly bearing is a load-bearing component of the assembly securing arrangement.

2. The assembly securing arrangement as claimed in claim 1, wherein the assembly bearings are arranged on end sides of the frame members.

3. The assembly securing arrangement as claimed in claim 1, wherein the assembly securing arrangement is configured to be secured on the motor vehicle body via securing points at the openings on the assembly bearings.

4. The assembly securing arrangement as claimed in claim 1, wherein the bearing support is screwed, riveted, welded or adhesively bonded to the frame members.

5. The assembly securing arrangement as claimed in claim 1, wherein the assembly securing arrangement has a rectangular basic shape, wherein narrow sides of the rectangle are formed by the two assembly bearings which are securable to body parts in the vehicle at sides of a longitudinal axis of the vehicle, and longitudinal sides of the rectangle are formed by the frame members that are each connected to the assembly bearings.

6. The assembly securing arrangement as claimed in claim 1, wherein each bearing block has a frustoconical shape.

7. The assembly securing arrangement as claimed in claim 1, wherein each bearing support has a square shaped body and a plurality of bulbous portions extending away from the square shaped body, each bulbous portion including one of the openings for securing the assembly securing arrangement.

8. The assembly securing arrangement as claimed in claim 7, wherein the square shaped body is positioned against the frame members and the bulbous portions extend beyond the frame members.

9. The assembly securing arrangement as claimed in claim 1, wherein the bearing supports are slanted in opposite directions.

10. The assembly securing arrangement as claimed in claim 1, wherein the bearing supports are composed of a material that is more rigid than an elastic material of the elastic bearing block.

11. The assembly securing arrangement as claimed in claim 1, wherein the two frame members are substantially identical and the two assembly bearings are substantially identical.

\* \* \* \* \*